United States Patent
Fuisting et al.

(10) Patent No.: US 12,028,007 B2
(45) Date of Patent: Jul. 2, 2024

(54) METHOD FOR DRIVING ELECTRIC MOTORS USING A PULSE-WIDTH-MODULATED SIGNAL

(71) Applicant: Hella GmbH & Co. KGaA, Lippstadt (DE)

(72) Inventors: Manfred Fuisting, Warendorf (DE); Jan Schmaeling, Hann. Muenden (DE)

(73) Assignee: Hella GmbH & Co. KGAA, Lippstadt (DE)

(*) Notice: Subject to any disclaimer, the term of this patent is extended or adjusted under 35 U.S.C. 154(b) by 162 days.

(21) Appl. No.: 17/727,527

(22) Filed: Apr. 22, 2022

(65) Prior Publication Data
US 2022/0271699 A1 Aug. 25, 2022

Related U.S. Application Data

(63) Continuation of application No. PCT/EP2020/079535, filed on Oct. 21, 2020.

(30) Foreign Application Priority Data

Oct. 22, 2019 (DE) ...................... 10 2019 128 495.3

(51) Int. Cl.
| | | |
|---|---|---|
| A47L 9/28 | (2006.01) | |
| H02P 27/08 | (2006.01) | |
| H02P 29/50 | (2016.01) | |

(52) U.S. Cl.
CPC ............ H02P 27/085 (2013.01); H02P 29/50 (2016.02)

(58) Field of Classification Search
CPC ....... H02P 7/29; H02P 21/0003; A47L 9/2826
See application file for complete search history.

(56) References Cited

U.S. PATENT DOCUMENTS

| | | |
|---|---|---|
| 5,739,658 A | 4/1998 | Thompson |
| 5,857,060 A | 1/1999 | Elliott et al. |
| 9,577,553 B2 | 2/2017 | Eggeling et al. |
| 9,628,000 B2 | 4/2017 | Schwantner et al. |

(Continued)

FOREIGN PATENT DOCUMENTS

| | | |
|---|---|---|
| DE | 102007003737 A1 | 8/2007 |
| DE | 102008008181 A1 | 8/2009 |

(Continued)

OTHER PUBLICATIONS

International Search Report dated Jan. 21, 2021 in corresponding application PCT/EP2020/079535.

*Primary Examiner* — Cortez M Cook

(74) *Attorney, Agent, or Firm* — Muncy, Geissler, Olds & Lowe, P.C.

(57) ABSTRACT

A method for driving electric motors using a pulse-width-modulated signal, wherein the pulse-width-modulated signal is a square-wave pulse consisting of successive pulses whose impulse duration is adjustable, as a result of which it is possible to change a duty cycle, which is the ratio of the impulse duration and the period of the square-wave pulse, wherein the reciprocal of the period of the square-wave pulse is the PWM frequency at which the impulses follow one another, wherein, during operation of the electric motor, the PWM frequency within a frequency band, without the duty cycle changing, is changed repeatedly and in accordance with a predefined scheme or randomly.

8 Claims, 2 Drawing Sheets

(56) References Cited

U.S. PATENT DOCUMENTS

| | | | |
|---|---|---|---|
| 11,324,372 B2* | 5/2022 | Xie | A47L 9/2826 |
| 2003/0142963 A1 | 7/2003 | Nadeau | |
| 2011/0006598 A1* | 1/2011 | Yamakawa | H02P 21/0003 |
| | | | 307/9.1 |
| 2013/0253420 A1* | 9/2013 | Favreau | H02P 8/38 |
| | | | 417/18 |
| 2015/0048771 A1* | 2/2015 | Caillaud | H02P 7/29 |
| | | | 318/519 |
| 2016/0135714 A1* | 5/2016 | Kawamoto | G01N 33/497 |
| | | | 600/538 |
| 2018/0234030 A1* | 8/2018 | Kamiko | H02M 7/5395 |

FOREIGN PATENT DOCUMENTS

| | | |
|---|---|---|
| DE | 102009049055 A1 | 4/2011 |
| DE | 102012009856 B3 | 5/2013 |
| DE | 102017114342 A1 | 1/2019 |
| WO | WO9705716 A1 | 2/1997 |
| WO | WO2013068087 A2 | 5/2013 |

\* cited by examiner

METHOD FOR DRIVING ELECTRIC MOTORS USING A PULSE-WIDTH-MODULATED SIGNAL

This nonprovisional application is a continuation of International Application No. PCT/EP2020/079535, which was filed on Oct. 21, 2020, and which claims priority to German Patent Application No. 10 2019 128 495.3, which was filed in Germany on Oct. 22, 2019, and which are both herein incorporated by reference.

BACKGROUND OF THE INVENTION

Field of the Invention

The present invention relates to a method for driving electric motors using a pulse-width-modulated signal, wherein the pulse-width-modulated signal is a square-wave pulse consisting of successive impulses whose impulse duration is adjustable. By setting the impulse duration, the so-called duty cycle can be set, which is the ratio of the impulse duration and the period of the square-wave pulse, the so-called period. The reciprocal of the period is the PWM frequency in which the impulses follow one another.

Description of the Background Art

Pulse-width-controlled electric motors are used in almost all areas of electric drive technology. In motor vehicles, for example, fan motors and the motors of electric adjustment systems are often electric motors. A pulse-width-controlled electric motor is driven by a control unit that generates the square-wave pulse, whose duty cycle is adjusted. As a result, the energy supplied to the electric motor is modulated, which allows for the speed to be controlled. Conventional ECUs are operated with a constant PWM frequency, which can be, e.g., 18 kHz or 20 kHz.

It is known that driving electric motors using pulse-width-modulation causes interference, which manifests itself, for example, as acoustic noise during radio reception. Interference can occur as harmonics of the PWM frequency and can be heard in particular when the harmonic has a frequency similar to the tuned radio station.

WO 97/05716 A1, which corresponds to U.S. Pat. No. 5,857,060, proposes using filters to reduce radio interference in order to avoid interference from a motor that is driven using pulse-width-modulation. Capacitors are used as filters.

In addition, the use of coils is known, which are arranged in addition to capacitors in the ECUs. Such EMC measures are costly and require a large installation space on the board, and they are partially not sufficiently effective.

WO 2013/068087, which corresponds to US 2014/0306630 proposes a method for driving a motor using pulse-width-modulation, which enables an improved reduction of interference. The idea behind this method is that unwanted interference can be avoided if the frequency of the square-wave pulse with which the motor is driven (PWM frequency) matches the carrier frequency, or if a multiple of the PWM frequency matches the carrier frequency. If harmonics of the PWM frequency correspond exactly to a multiple of the carrier frequency, they are not audible because they are on the carrier frequency.

The method disclosed in document WO 2013/068087 has the disadvantage that, in order to avoid interference, the carrier frequency of the tuned radio station must be known. In addition, only one signal can be taken into account when suppressing interference.

In the vicinity of a motor vehicle and in a motor vehicle, however, a wide range of frequency bands is used in parallel by various technical systems (e.g., commercial radio, DAB, GPS, FM . . . ). The objective is therefore to avoid interference with the technical systems.

SUMMARY OF THE INVENTION

It is therefore an object of the present invention to carry out a frequency adjustment without the use of a determined carrier frequency in order to reduce interference across the spectrum.

This object is achieved according to the invention in that, during operation of the electric motor, the PWM frequency within a frequency band, without the duty cycle changing, is changed repeatedly in accordance with a predefined scheme or randomly.

The method quickly changes the set PWM frequency so that a pronounced interference and an exceedance of limit values during motor control cannot occur in the frequency range used and its harmonics. The power of the interference spectrum is distributed broadband over a wide frequency range.

The PWM frequency can be changed after a time or n-period, wherein n is a natural number. The time or natural number n can be set when the motor is started and kept constant for the operating time of the motor. However, it is also possible that the time or the number n is varied during motor operation. Furthermore, it is possible that the time or the number n is set once and then not changed when the motor is started.

It is possible that the time or the natural number n is determined randomly.

The PWM frequency can be increased or decreased by a predefined amount. It is also possible that the PWM frequency is increased or decreased by a randomly determined amount. The amount by which the PWM frequency is increased or decreased can be an integer part of the width of the frequency band within which the PWM frequency can be varied.

It is possible that the PWM frequency, starting from an initial value, can be gradually increased after the expiry of the time or after each nth period until an upper limit of the frequency band is reached. After reaching the upper limit, the gradual increase at the lower limit can be started again. Instead, after reaching the upper limit, the PWM frequency could also be gradually reduced until the lower limit of the frequency band is reached.

Alternatively, the PWM frequency, starting from an initial value, could be gradually reduced after the expiry of the time or after each nth period until a lower limit of the frequency band is reached. After reaching the lower limit, the gradual reduction at the upper limit could then start again. Instead, after reaching the lower limit, the PWM frequency could be gradually increased until the upper limit is reached.

The method according to the invention may be designed in such a way that the upper limit and the lower limit of the frequency band are adjustable.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The method according to the invention begins with a few steps to prepare the motor start, in which some settings are defined. These can be retrieved from a memory as default settings. Values set in this way can be an initial value Default_f=20 kHz for a PWM frequency Freq_Dyn and a time Time_step_size=0.5 ms, after which a change in the PWM frequency Freq_Dyn is to take place. Furthermore, an amount Freq_step_size by which the PWM frequency Freq_Dyn is changed can be set. The lower limit Freq_Min and the upper limit Freq_Max of a frequency band within which the PWM frequency Freq_Dyn is to be can also be defined in this way.

Figure 1:
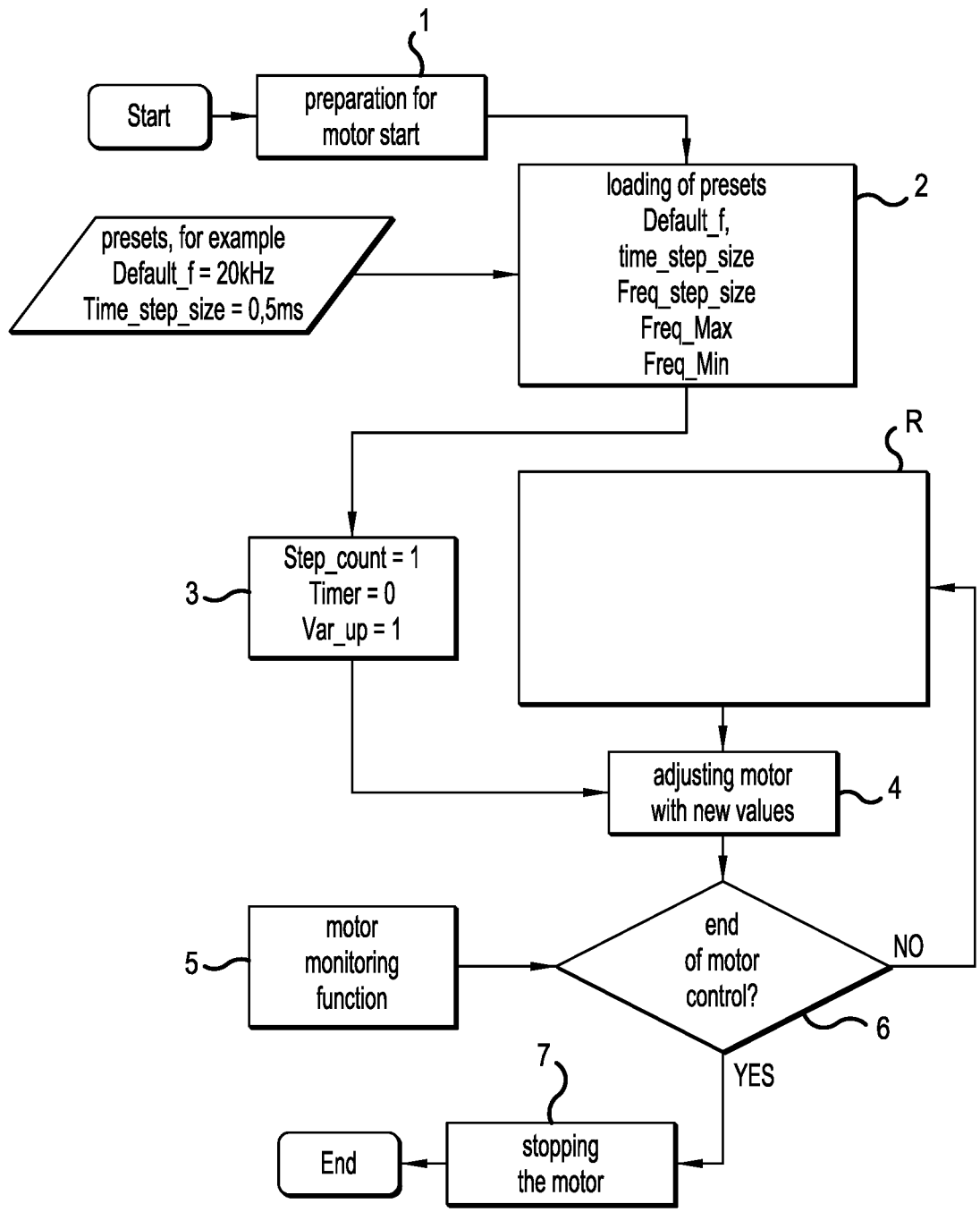
FIG. 1 illustrates a flow chart of a method according to the invention.
Figure 1A:
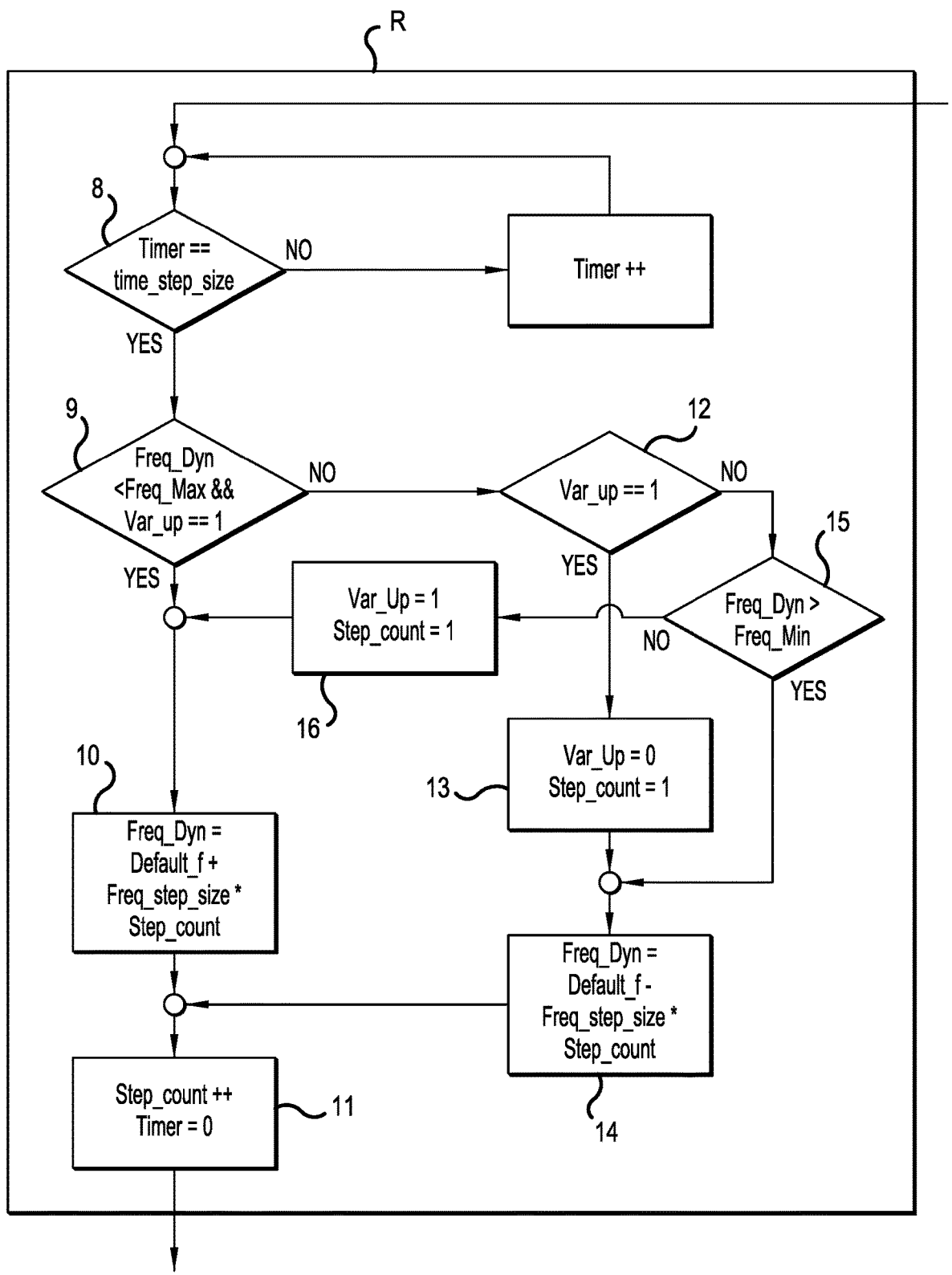
FIG. 1a shows a routine from the method according to FIG. 1 in detail.

In a further step, before entering a routine R (see FIG. 1a) to change the PWM frequency Freq_Dyn, a counter Step_count=1, a clock Timer=0 and a flag Var_up=1 are initialized. The counter Step_count counts how many times the PWM frequency has been increased or decreased. With the clock Timer a time is recorded and with the setting of the flag Var_up it is determined that the PWM frequency Freq_dyn should be increased and not decreased.

Then, in step 4, the motor is started with the settings made. In parallel, a routine 5 for monitoring the motor will be started. Then, the time measurement with the clock Timer is started. If routine 5 for monitoring the motor does not indicate in the query in step 6 that the motor is to be stopped (step 7), after which the method according to the invention ends, the method is started with routine R to change the PWM frequency Freq_Dyn.

In routine R, the PWM frequency Freq_Dyn is first gradually increased by the amount Freq_step_size after the expiry of the time Time_step_size. Once the upper limit Freq_Max of the frequency band is reached, the PWM frequency Freq_Dyn is gradually reduced by the amount Freq_step_size after the expiry of the time Time_step_size, until the PWM frequency is gradually increased again after reaching the lower limit Freq_Min.

After entering this routine R, it is first checked in step 8 whether the clock Timer has an expiry of time Time_step_size since the start of the motor in step 4. If this is not the case, the clock continues to measure and in step 8 the time is checked until the clock has recorded the expiry of the time Time_step_size. Then, in step 9, it is checked whether the PWM frequency Freq_Dyn should be increased. For this purpose, it is checked whether the flag Var_up is set and whether the PWM frequency Freq_Dyn is smaller than the upper limit Freq_Max. If both are the case, the PWM frequency Dyn_freq is increased in step 10. For this purpose, the latter is set to the initial value Default_f plus the amount Freq_step_size multiplied by the state of the counter Step_count.

Then, in step 11, the counter Step_count is incremented, and the clock Timer is reset to 0.

Routine R is then exited and in a new call to step 4, the new values are transferred to the motor.

After step 4, step 6 checks again whether the motor should be switched off.

If it turns out in Routine R, during the check in step 9, that the PWM frequency Freq_Dyn should not be increased, this may be due to the fact that the flag Var_up is not set. This means that the PWM frequency Freq_Dyn should be reduced. Whether the flag Var_up is set or not is checked in step 12.

If the check in step 12 shows that the flag Var_up is set, this means that after the check in step 9, the PWM frequency Freq_Dyn has not been increased because the PWM frequency Freq_Dyn has reached the upper limit Freq_Max. Then, it is necessary to switch from an increase to a decrease in the PWM frequency Freq_Dyn. For this change, the flag Var_up must be deleted, which is done in step 13. At the same time, the counter Step_count is reset to 0 with the switch. In step 14, there is then a first reduction in the PWM frequency Freq_Dyn by setting it to the initial value Default_f minus the amount Freq_step_size multiplied by the state of the counter Step_count. After step 14, in step 11, the counter Step_count is then incremented, and the clock Timer is set to 0. In step 4, the values are then transferred to the motor.

If, on the other hand, the check in step 12 reveals that the flag Var_up is deleted, step 15 first checks whether the PWM frequency Freq_Dyn may still be reduced or whether it has already reached the lower limit of the frequency band. If the PWM frequency Freq_Dyn can still be reduced, this is done in step 14. If the PWM frequency Freq_Dyn cannot be further reduced, step 16 switches to the mode of increasing the PWM frequency Freq_Dyn. To do this, the flag Var_up is set and the counter Step_count is reset to 0 in order to then perform the increase in step 10 in the manner described.

The method shown can be varied, for example, by the fact that the PWM frequency is not changed after the expiry of a time Time_step_size, but after a randomly determined number of n periods or after a randomly determined number n of time intervals of the length time_step_size. It is also possible that the time time_step_size is set to a new random value after each frequency change.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for driving electric motors, the method comprising:
   providing a pulse-width-modulated signal, wherein the pulse-width-modulated signal is a square-wave pulse formed of successive pulses whose impulse duration is adjustable, as a result of which it is possible to change a duty cycle, the duty cycle being a ratio of the impulse duration and the period of the square-wave pulse, wherein the reciprocal of the period of the square-wave pulse is a PWM frequency at which the impulses follow one another; and
   changing repeatedly, during operation of the electric motor, the PWM frequency within a frequency band and without the duty cycle changing and in accordance with a predefined scheme or randomly, wherein the PWM frequency is increased or decreased by a predefined amount, and wherein starting from an initial value, the PWM frequency is gradually increased after the expiry of a time or after each nth period until an upper limit of the frequency band is reached or, starting from an initial value, the PWM frequency is gradually reduced after the expiry of the time or after each nth period until a lower limit of the frequency band is reached.

2. The method according to claim 1, wherein the PWM frequency is changed according to a time, according to n time intervals of the length of time or after n cycles, wherein n is a natural number.

3. The method according to claim 2, wherein the natural number n is determined randomly.

4. A method for driving electric motors, the method comprising:

providing a pulse-width-modulated signal, wherein the pulse-width-modulated signal is a square-wave pulse formed of successive pulses whose impulse duration is adjustable, as a result of which it is possible to change a duty cycle, the duty cycle being a ratio of the impulse duration and the period of the square-wave pulse, wherein the reciprocal of the period of the square-wave pulse is a PWM frequency at which the impulses follow one another; and changing repeatedly, during operation of the electric motor, the PWM frequency within a frequency band and without the duty cycle changing and in accordance with a predefined scheme or randomly wherein the PWM frequency is increased or decreased by a randomly determined amount, and wherein starting from an initial value, the PWM frequency is gradually increased after the expiry of a time or after each nth period until an upper limit of the frequency band is reached or, starting from an initial value, the PWM frequency is gradually reduced after the expiry of the time or after each nth period until a lower limit of the frequency band is reached.

5. The method according to claim 1, wherein after reaching the upper limit, the gradual increase at the lower limit starts again or wherein after reaching the lower limit the gradual reduction at the upper limit starts again.

6. The method according to claim 1, wherein after reaching the upper limit the PWM frequency is gradually reduced until the lower limit is reached or wherein after reaching the lower limit the PWM frequency is gradually increased until the upper limit is reached.

7. The method according to claim 1, wherein the upper limit and the lower limit of the frequency band are adjustable.

8. A control unit for driving an electric motor, wherein the control unit for driving the electric motor is adapted for the method according to claim 1.

* * * * *